United States Patent [19]

Kunz

[11] 4,062,417

[45] Dec. 13, 1977

[54] WEIGHING APPARATUS INCLUDING LINEARIZED ELECTROMAGNETIC COMPENSATION MEANS

[75] Inventor: Peter Kunz, Tann-Ruti, Switzerland

[73] Assignee: Mettler Instrumente AG, Zurich, Switzerland

[21] Appl. No.: 686,513

[22] Filed: May 14, 1976

[30] Foreign Application Priority Data

July 22, 1975 Switzerland .................. 9559/75

[51] Int. Cl.² .................. G01G 7/00; G01G 3/14
[52] U.S. Cl. .................. 177/212; 177/210 C
[58] Field of Search .................. 177/1, 210 R, 210 C, 177/210 F/P, 212

[56] References Cited

U.S. PATENT DOCUMENTS

| 3,133,606 | 5/1964 | Thomson | 177/212 X |
|---|---|---|---|
| 3,604,525 | 9/1971 | Blethen et al. | 177/212 X |
| 3,688,854 | 9/1972 | Strobel | 177/212 X |
| 3,816,156 | 6/1974 | Baumann | 177/212 X |
| 3,955,638 | 5/1976 | Wasko | 177/212 |
| 3,968,850 | 7/1976 | Gaskill | 177/212 X |

Primary Examiner—George H. Miller, Jr.

Attorney, Agent, or Firm—Lawrence E. Laubscher

[57] ABSTRACT

Improved weighing apparatus of the electromagnetic type is disclosed including linearizing means for controlling the operation of either the compensating means or the indicating means of the system to effect linearization of the load indication over the weighing range, whereby the effect of the compensating coil magnetic field on the main magnetic field of the instrument is eliminated. In the preferred embodiment, smoothing capacitor means are connected with the reference voltage input terminal of the voltage-to-current converter of the constant current source, switch means being operable to control the charging and discharging of the smoothing capacitor means in accordance with the time periods during which compensating current is periodically supplied to the compensating coil means. In an alternate embodiment, the linearization means are provided within the internal structure of digital voltmeter means, and in a further embodiment, the linearization means includes an analog multiplier connected between the digital voltmeter means and the measuring resistor across which the compensation current to the coil is measured.

5 Claims, 5 Drawing Figures

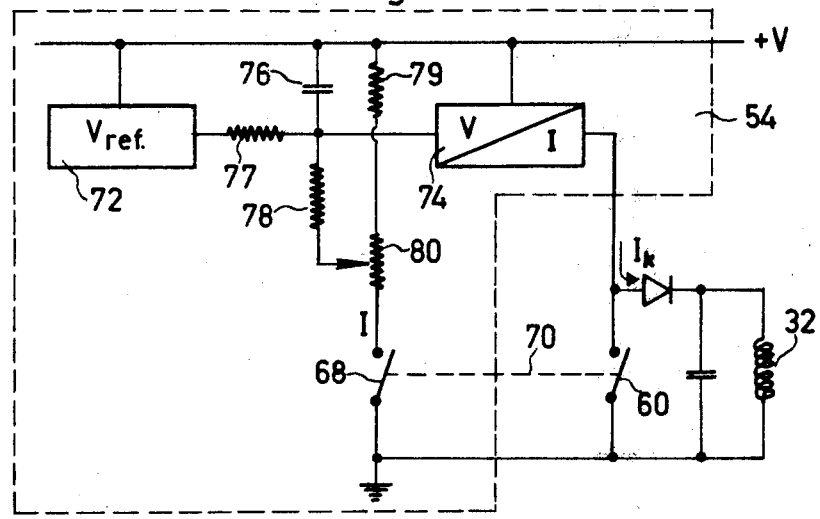
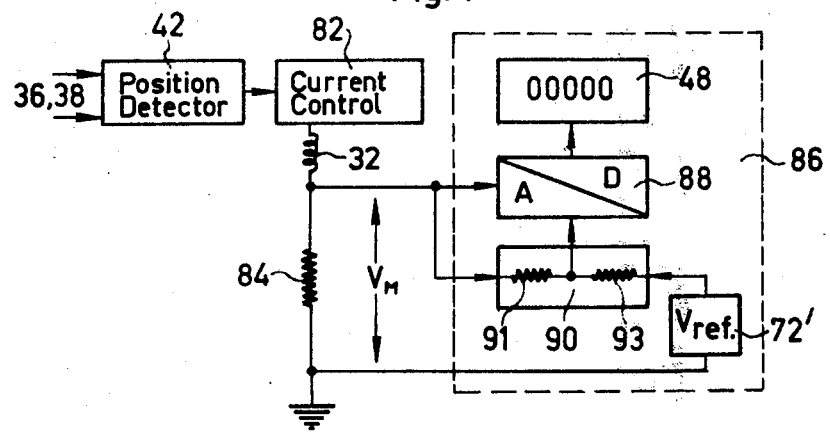
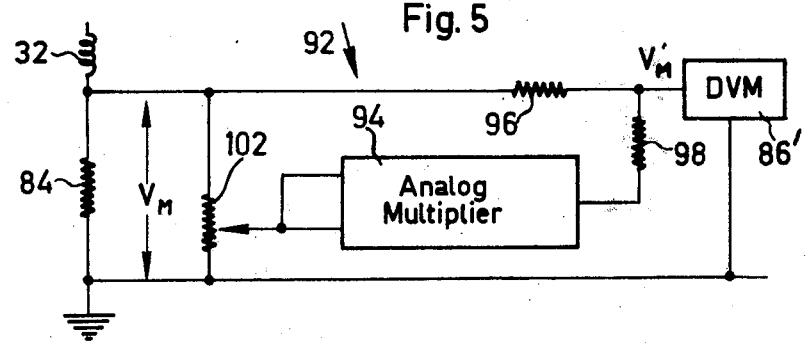

WEIGHING APPARATUS INCLUDING LINEARIZED ELECTROMAGNETIC COMPENSATION MEANS

BRIEF DESCRIPTION OF THE PRIOR ART

Weighing apparatus of the type including electromagnetic compensation means are well known in the patented prior art, as evidenced by the U.S. Pat. Nos. 3,786,678 and 3,786,883, to Kunz Allensbach 3,786,884 and 3,788,410, Baumann et al. 3,816,156 and 3,872,936, Baumgartner 3,677,357 and Strobel 3,688,854 (all assigned to the same assignee as the instant invention).

In these prior weighing systems, a movable weighing member is displaced relative to a stationary frame member, position sensing means being provided for sensing the relative positions of the members. The position detector is part of a control for determining the magnitude of a compensation current which in operation flows through a compensation coil fixed to the movable part of the apparatus. The compensation coil is arranged in the air gap of a permanent magnet system, and the apparatus also has an evaluation circuit for ascertaining the magnitude of the compensation current flowing through the compensation coil. Thus, when the movable part of the apparatus is moved under a load to be weighed, the position detector senses such movement and causes the flow, through the compensation coil, of a compensation current of such a magnitude as to cause the movable part to be returned substantially to its neutral position, i.e., the position which it has before the load to be weighed is applied thereto. This is because the current flowing through the compensation coil produces a force in the field of the permanent magnet system to produce the desired movement of the movable part of the balance back towards its neutral position. The evaluation circuit ascertains the magnitude of the compensation current, and from this provides an indication of the weight of the load causing the initial movement of the movable part of the apparatus.

In weighing apparatus of this kind, an important factor is linearity, that is to say, precise proportionality, over the entire operating range of the weighing apparatus, between the magnitude of the compensation current and the weight or load which is to be weighed. Linearity is impaired in particular because the compensation current superimposes on the field of the permanent magnet system a further magnetic field whose magnitude and direction depend on the current strength and the magnet configuration. The resulting strengthening (or weakening) of the permanent magnet system field necessarily results in a change in the force acting on the compensation coil, per unit of current strength, and thus results in a non-linear relationship as between the weight and the magnitude of the compensation current.

In a previously proposed weighing apparatus with a rotationally symmetrical permanent magnet system, a weighing pan arranged above the magnet system, and a cylindrical compensation coil in an air gap at the lower end of the magnet system, non-linearity can be, for example, of the order of magnitude of promilles. Such degrees of non-linearity are not acceptable for modern electrical weighing apparatus having a resolution of $10^4$ and more digits.

For the purposes of achieving a condition of linearity, it has been proposed that an auxiliary coil may be connected in series with the compensation coil, around the iron core of the magnet system. The auxiliary coil compensates in turn for the influence of the compensation current on the magnetic field in the air gap. This arrangement suffers from the disadvantage that it involves a substantial increase in expense in the cost of the components and the assembly of the apparatus and, in addition, particularly in the case of compact balances, the auxiliary coil can be a drawback because of the amount of space which it requires. Furthermore, the auxiliary coil brings an additional loss in efficiency and this, together with the resulting generation of heat, are undesirable. There are also problems with the temperature-dependence of the coil resistance.

The present invention was developed to avoid the above and other drawbacks of the known electromagnetic compensation weighing systems.

SUMMARY OF THE INVENTION

Accordingly, a primary object of the present invention is to provide a weighing apparatus comprising a movable part which is movable in response to a load to be weighed, a stationary permanent magnet system having an air gap, a coil which is fixedly connected with the movable part and which is disposed in the air gap of the permanent magnet system, a position detector for sensing the position of the movable part, a control circuit operable in response to the sensing output of the position detector for determining the value of a current which in operation flows through the coil thereby to provide electromagnetic counteraction to the movement of the movable part, an evaluation circuit for ascertaining the value of the current flowing in the coil, thereby to afford an indication of the load, and correction means for influencing the evaluation circuit in dependence on the value of the compensation current, thereby to linearize the relationship between the compensation current and the load to be weighed.

In a preferred embodiment of the invention, a constant current source is connected with the compensation coil by means including a switch (such as an electronic switch) during time intervals which are variable as a function of the load applied to the apparatus for weighing, the length of such time intervals being measured by means of clock pulses, and the correction means being operable to influence the length of the time intervals. Preferably in this arrangement, the correction means includes a second switch which is operated synchronously with the first switch, and smoothing capacitor means connected by way of a resistor arrangement with a reference voltage source associated with the constant current source.

In another embodiment of the invention, the weighing apparatus includes a digital voltmeter for digitization and display of the compensation current which is ascertained by measuring resistor means in the form of a measuring voltage. In this embodiment, the correction member includes an element which alters the reference voltage of the digital voltmeter as a function of the measuring voltage. In another embodiment, the correction means comprises an analog multiplier which is connected between the measuring resistor and the digital voltmeter in such a way that the measuring voltage is corrected before being supplied to the digital voltmeter.

BRIEF DESCRIPTION OF THE FIGURE

Other objects and advantages of the invention will become apparent from a study of the following specification when viewed in the light of the accompanying drawing, in which:

FIG. 3 is a detailed electrical schematic diagram of the electromagnetic compensation linearization means of the present invention as embodied in FIG. 2; and FIGS. 4 and 5 are second and third embodiments of the electromagnetic compensation linearization means.

DETAILED DESCRIPTION

Figure 1:
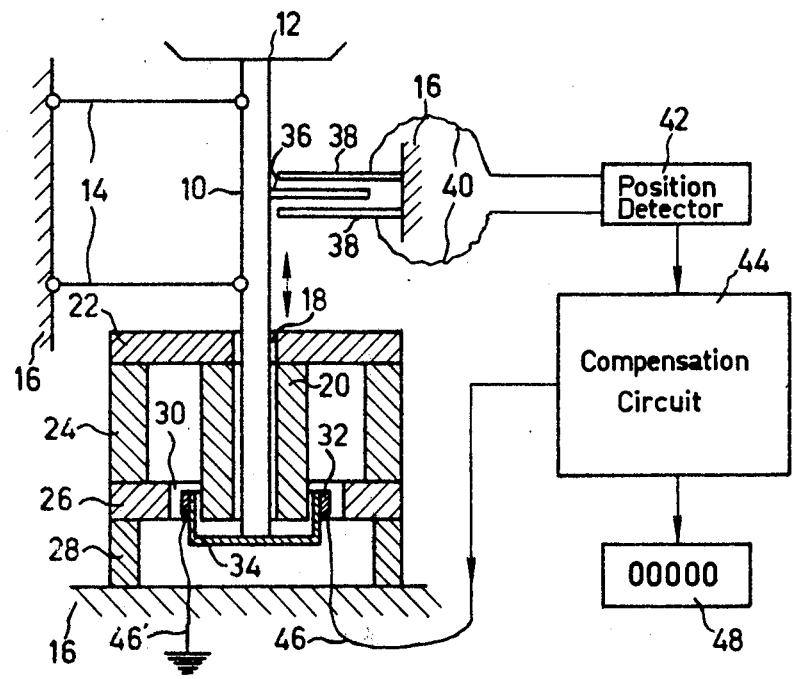
FIG. 1 is a schematic illustration of the conventional weighing apparatus including electromagnetic compensation means.

Referring first more particularly to FIG. 1, as is conventional in the art, the electromagnetic compensation weighing apparatus includes a vertical support member 10 for supporting at its upper end a weighing pan 12. The support member 10 is connected by connecting links 14 for guided vertical movement relative to the stationary frame 16. The support member 10 is thus movable vertically in FIG. 1, but will remain parallel to itself.

The support member 10 passes with clearance through a central opening 18 contained in an upper round closure plate 22 of ferromagnetic material, to the undersurface of which is secured a cylindrical iron core 20. Arranged in concentrically spaced relation about the core 20 is an annular permanent magnet 24 which is connected at its upper end with the plate 22 and at its lower end with a pole shoe plate 26. An annular base member 28 of non-magnetic material defines means for mounting the system 20, 22, 24, 26 on the frame 16.

A compensation coil 32 is movably disposed in an annular air gap 30 between the core 20 and the pole shoe 26, said coil 32 being wound on a carrier 34 of electrically insulating material which is fixedly connected with the lower end of the support member 10 of the load receiving means.

The apparatus also includes position detecting means for sensing the position of the member 10 and pan 12, the position detecting means comprises differential capacitance means including a capacitor plate 36 secured to the member 10 between, and on the side of the member which is remote from, the two links 14, and two further stationary capacitor plates 38 which are secured to the frame 16 on opposite sides of the movable capacitor plate 36.

Other conventional mechanical details such as the housing and the movement-limiting abutment means for the movable part 10, 12 of the apparatus have been omitted for the sake of simplicity in the drawings.

The electrical components of the weighing apparatus, which are only indicated diagrammatically in FIG. 1, include, besides the coil 32 and the differential capacitor 36 and 38, position detecting circuit means 42 connected by leads 40 with the capacitor plates 38. The circuit 42 is, for example, generally a bridge circuit, the output terminals of which are connected with the input terminals of compensation circuit means 44. One output terminal of the compensation circuit means is connected with ground via conductor 46, compensation coil 32 and conductor 46', the other output terminal of the compensating means being connected with load indicating means 48.

Thus upon deflection of the movable unit 10, 12 by the load to be weighed away from its normal neutral position (at which the movable capacitor plate 36 is spaced equally between the stationary plates 38) a difference or error signal is generated by the position detecting means 42 that is supplied to the input terminal of the load compensation circuit 44 which determines the amount of compensation current that is to be supplied to the compensating coil 32. This signal determines, in the control part of the compensation circuit 44, the magnitude of a compensation current to be passed through the coil 32. The electromagnetic force action of the coil current on the magnetic field in the air gap 30, when the apparatus is in the steady or equilibrium condition, electromagnetically counteracts or compensates for the action of the weight of the load to be weighed on the weighing pan 12 (and possibly also the dead load of the weighing apparatus, that is to say, its own tare weight), so that the weighing apparatus is returned substantially to its neutral position, in known manner. The magnitude of the compensation current required for this return movement is converted into a digital weight value in the evaluation part of the circuit 44, and displayed at the digital display means 48. The operation of this system is described in greater detail in the aforementioned Kunz U.S. Pat. Nos. 3,786,678 and 3,786,883, among others.

As already mentioned above, when the above-mentioned compensation action occurs there is a non-linearity which increases in degree, with increasing weight on the pan 12. This non-linearity occurs because a further magnetic field is superimposed on the constant magnetic field of the permanent magnet system 20, 22, 24, 26 in its air gap 30, this further magnetic field being produced by magnetization of the iron core 20 by the coil 32 when the compensation current is flowing through it, proportionally to the strength of the current flowing in the coil. This further magnetic field which, as mentioned, increases with increased load to be weighed because the increased load will cause a resultant increase in the compensation current, causes the compensation current to have a non-proportional force action, that is to say, more weight corresponds, in comparative terms, to a weak current, and thus to an excessively low display. (It should be noted that, depending on the practical construction of the apparatus, in particular the magnet configuration and the arrangement of the air gap 30, this non-linearity effect can also be reversed, that is to say, there can be a weakening of the effective electromagnetic compensation field resulting in the weight values displayed being excessively high.) Varying non-linearity occurs in this way because the magnetic field produced by the compensation coil 32 acts with and thus strengthens the permanent magnet field in a part of the air gap, but in another part of the air gap 30 it acts against and thus weakens the permanent magnet field. The differences in permeability of magnetic material, iron core and air result in asymmetric distribution of the additional magnetic field so that the weakening part and the strengthening part do not cancel each other out completely in the region of the coil, and it is the remaining difference between the weakening and the strengthening actions which produces the non-linearity.

Figure 2:
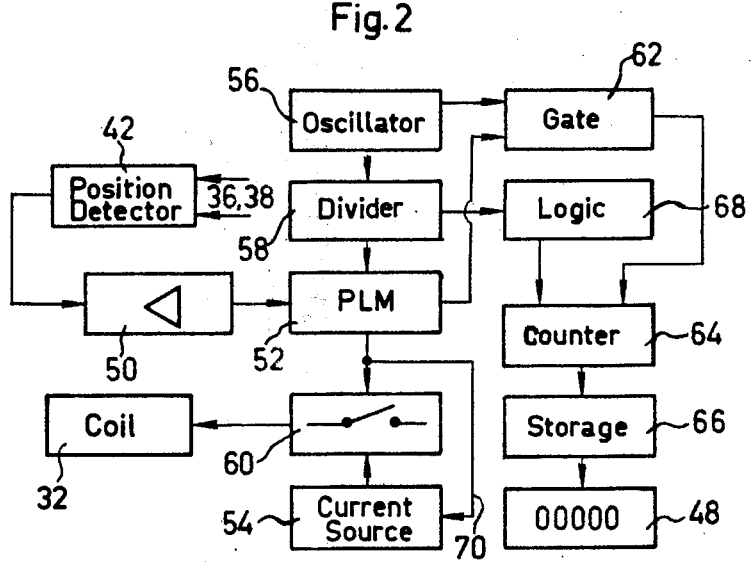
FIG. 2 is a block diagram of the electrical circuitry of the apparatus of FIG. 1 including a first embodiment of the invention.

In accordance with the present invention, means are provided for effecting non-linear correction as the compensation current in the coil 32 increases. Referring now to FIGS. 2 and 3, for this purpose the conversion as between the strength of the coil current and the display at 48 is influenced, in dependence on the current. The FIG. 2 circuit operates on the principle of pulse length modulation. More particularly, the signal from the position detector 42 passes into a control amplifier 50 and from there is passed to a pulse length modulator 52 in which the transmitter output signal is compared to a constant-frequency sawtooth voltage of period T. The circuit has an oscillator 56 acting as a clock means which starts the sawtooth voltage in the pulse length modulator 52, at a frequency which is reduced in a frequency divider 58. At the same time, the pulse length modulator 52 sends a signal to an electronic switch diagrammatically shown at 60 which at that moment connects the coil 32 to a constant current source 54. As soon as the sawtooth voltage in the pulse length modulator 52 has reached the value of the control signal from amplifier 50, the current is switched off from the coil 32, by a further signal of the pulse length modulator 52 to the switch 60. This is repeated in each period T. The operation of the pulse length modulator is disclosed in the aforementioned Kunz patents.

During the time that the current source 54 is connected with the coil 32, high-frequency clock pulses pass from the oscillator 56 through a gate 62 to a counter 64. When the current is switched off from the coil 32, the gate 62 is closed, and the condition of the counter 64 is transferred to a storage means 66 and displayed at 48 as a display of the weight of the material being weighed. At the beginning of the next period T, the gate 62 is re-opened by the pulse length modulator 52 and the counter 64 is set to zero by means of a logic unit 68 which is controlled by the frequency divider 58. The next value-evaluation and display cycle then begins.

FIG. 3 illustrates the manner of correction of the above-mentioned non-linearity. The current source 54 includes a reference voltage source 72 (V ref), such as a Zener diode, which is the determining factor as regards the amplitude of the current from the current source 54. The source 72 is connected with a voltage-to-current converter 74 (via resistor 77). The output terminal of resistor 77 is also connected with the positive power supply + V by smoothing capacitor 76, and is connected, via resistor 78, with the movable contact of variable resistor 80 which is connected in series with resistor 79 and switch 68 to define a series branch connected between the positive power supply + V and ground. Switch 68, which constitutes the logic unit of FIG. 2, is opened and closed synchronously with current control switch 60, as indicated diagrammatically by the dashed connection 70. Sudden changes in voltage occur at the converter 74 synchronously with changes in the positions of the switches 60 and 68, the degree of such changes in voltage depending on the dimensioning of the resistor network 77, 78, 79 and 80, wherein for example the resistor 78 is of much higher value than the adjustable resistor 80. The capacitor 76 has a smoothing function which causes substantially direct-current voltage to be applied to the converter 74; this direct-current voltage is corrected, that is to say in this case reduced, in dependence on the length of the period of time for which the current source 54 is connected to the compensation coil 32. This results in a lower current $I_K$ and thus a longer period of connection of the current source 54 to the compensation coil 32, for a given weight to be measured. This is because the mean compensation current operative in the coil 32 is determined by the amplitude of current $I_K$ on the one hand and the length of the above-mentioned connection period on the other hand. As the above-mentioned connection period, which is counted off by the constant-frequency clock pulses from 56, represents a measurement of the weight to be weighed, the result is a corrected display, with the current flowing through the coil 32 being the same. With suitable dimensioning of the circuit components, it is possible substantially to eliminate the non-linearity, which is essentially quadratic. To give a concrete example, it was possible for the improvement in the degree of linearity to be about a factor of 50 (from 1:1000 to 1:50000).

The adjustable resistor 80 permits fine adjustment of the linearization action.

Therefore, besides the control of the compensation current flowing through the coil 32, in dependence on the load, by means of the position detector 42, there is internal correction of the strength or amplitude of current $I_K$ and thus of the length of the connection period, in dependence on such period.

Reference will now be made to FIGS. 4 and 5 which illustrate two further embodiments of a weighing apparatus, such as a balance, in which the compensation current for the coil 32 comes from current control means 82 to which the output of the position detector 42 is fed. The current from the current control means 82 is detected at a measuring resistor 84, in the form of a measuring voltage ($V_m$), and put into a digital form and displayed by a digital voltmeter 86 (FIG. 4) or 86' (FIG. 5), respectively. The digital voltmeter is a conventional device which operates on the dual-slope principle and in which, during a given time interval, the variable measuring voltage (at resistor 84) is integrated by charging a measuring capacitor, the measuring capacitor then being discharged against a constant reference voltage, the discharging time being counted by clock pulses and thus providing the digital result.

Thus, in the embodiment shown in FIG. 4, which is similar in principle to the apparatus of FIG. 3, voltage divider means 90 are connected between a reference voltage source 72' and the analog-to-digital converter 88 of digital voltmeter 86. The voltage divider means 90 alters (for example reduces) the reference voltage which is effective at the analog-to-digital converter 88, in dependence on the measuring voltage $V_M$ at resistor 84, in order thereby to change the discharging time of the measuring capacitor (for example to increase it). The voltage divider means 90 includes a pair of resistors 91 and 93 which are of different values and to which the variable measuring voltage $V_M$ and the constant reference voltage 72' (V ref), respectively, are applied. This results in correction of the reference voltage applied to the analog-to-digital converter 88, in dependence on the value of $V_M$.

In the embodiment of FIG. 5, the digital voltmeter 86' itself is unaltered. However, the digital voltmeter 86' is supplied with a measuring voltage $V_M'$ which has already been rendered linear. More particularly, the linearization of the input signal to the digital voltmeter 86' is achieved by a linearization circuit generally indicated at 92, including a potentiometer 102 connected in parallel with the measuring resistor 84. The movable tap of the potentiometer 102 is connected with two inputs of a commercially available analog multiplier 94 (for example, of the type "Motorola" MC 1495), at the output of which the squared input voltage then appears. The two resistors 96 and 98 define voltage divider means, and the resulting appropriately corrected measuring voltage $V_M'$ is supplied to the digital voltmeter 86'. The potentiometer 102 is provided to effect fine adjustment of the linearization action. Compensation circuit means similar to those of FIGS. 4 and 5 are described in greater detail in the U.S. Pat. No. 3,677,351 to Baumgartner.

The above-described embodiments all have a magnetic system which is asymmetric with respect to a horizontal plane through the compensation coil 32. While such magnet systems have considerable advantages as regards compactness of construction and relatively low weight, hitherto only a part of the air gap was utilized, in order to keep the linearity error at a low level; as the additional magnetic field induced by the compensation current flowing in the coil 32 was distributed asymmetrically over the length of the air gap, as described above, with a correspondingly shorter compensation coil it was possible to set a position for minimum non-linearity. Accordingly, an advantage of the linearization action in the embodiments as described above is that it permits the full length of the air gap to be utilized. This means that the coil 32 can be correspondingly lengthened, with the result that there is a lower strength of current flowing in the coil, for the same electromagnetic compensation force produced thereby, and thus a lower power consumption is achieved, which also means that a smaller amount of heat is generated, and this factor is often of considerable importance for precision balances.

To give a practical example, in one case it was found possible to reduce the coil power from 2 watts to 1.4 watt, which is a reduction of 30%.

With magnet systems which are of a symmetrical construction with respect to a plane through the middle of the air gap, non-linearities in the lower half of the air gap substantially cancel out non-linearities in the upper half of the air gap, so that any residual non-linearity, when the coil is symmetrically arranged in the air gap, is relatively small. In these cases, however, the linearization action as described above with reference to the drawings is also useful, whether it be for example for compensating for the above-mentioned residual non-linearity or whether it be for adjusting for differences in the properties of the material of the upper and lower halves of the magnet system. Thus, the provision of the described linearization action makes it possible to obviate the need for precisely identical pairs of magnets to form the magnet system. The circuit of FIG. 3, for example, could be so constructed, in such a case, that, by utilizing two additional switches 68, two current paths I and $I_k$ could be alternately cut in and out, synchronously with the cutting in and out of the compensation coil 32, while the magnitude of the respective voltage pulses could be determined by a potentiometer as at 80, connected between the two current paths. In this way it would be possible to effect an increase or a reduction in the voltage which is smoothed by the capacitor 76 and which is operative at the converter 74.

While in accordance with the provisions of the Patent Statutes, the preferred form and embodiments of the invention have been illustrated and described, it will be apparent to those in the art that various changes and modifications may be made without deviating from the inventive concepts set forth above.

What is claimed is:
1. In a weighing apparatus including a stationary member, a load-responsive movable member displaceable from a no-load position toward a load position relative to said stationary member, means (20) associated with said stationary member for generating a magnetic field, a compensation coil connected with said movable member and arranged in said magnetic field, position sensing means (36) connected for generating a position signal as a function of the displacement of the movable member from its no-load position, control means (54) responsive to said position signal for supplying to said compensation coil compensating current of a magnitude to produce an electromagnetic force for returning the movable member toward its initial no-load position, and load indicating means for indicating the magnitude of the load applied to said movable member as a function of the compensating current supplied to said compensation coil;
the improvement wherein
at least one of said control means and said load indicating means includes non-magnetic linearization circuit means isolated from said magnetic field generating means for linearizing the indication of the load indicating means over the weighing range of said weighing apparatus.

2. In a weighing apparatus including a stationary member, a load-responsive movable member displaceable from a no-load position toward a load position relative to said stationary member, means associated with said stationary member for generating a magnetic field, a compensation coil connected with said movable member and arranged in said magnetic field, position sensing means connected for generating a position signal as a function of the displacement of the movable member from its no-load position, control means responsive to said position signal for supplying to said compensation coil compensating current of a magnitude to produce an electromagnetic force for returning the movable member toward its initial no-load position, and load indicating means for indicating the magnitude of the load applied to said movable member as a function of the compensating current supplied to said compensation coil;
the improvement which comprises
a. linearization means for modifying said control means to effect linearization of the indication of the load indicating means over the weighing range;
b. said control means including a constant current source, and means including first switch means (60) for alternately connecting and disconnecting said constant current source with said compensation coil for time intervals which vary as a function of the load;
c. said load indicating means including means for measuring the length of the connecting time intervals by clock pulse means, said linearizing means being operable to vary the length of the connecting time intervals to linearize the compensation current supplied to said compensation coil.

3. Apparatus as defined in claim 2, wherein said constant current source (54) includes a reference voltage source (72), and voltage-to-current converter means (74) connected with said reference voltage source; and further wherein said linearization means includes capacitor means (76) connected at one end with a junction between said reference voltage source and said voltage-to-current converter means, and means including second switch means (68) and resistor means (78, 79, 80) for discharging and charging said capacitor means to a given potential in synchronism with the operation of said first switch means.

4. In a weighing apparatus including a stationary member, a load-responsive movable member displaceable from a no-load position toward a load position relative to said stationary member, means associated with said stationary member for generating a magnetic field, a compensation coil connected with said movable member and arranged in said magnetic field, position sensing means connected for generating a position signal as a function of the displacement of the movable member from its no-load position, control means responsive to said position signal for supplying to said compensation coil compensating current of a magnitude to produce an electromagnetic force for returning the movable member toward its initial no-load position, and load indicating means for indicating the magnitude of the load applied to said movable member as a function of the compensating current supplied to said compensation coil;

the improvement which comprises
linearization means for modifying said load indicating means to effect linearization of the indication of the load indicating means over the weighing range, said load indicating means including
a. a measuring resistor (84) connected with said compensation coil to provide a load measuring voltage ($V_M$), and
b. digital voltmeter means (86) connected across said measuring resistor for providing a digital indication of the load applied to said movable member, said digital voltmeter means including
 1. analog-to-digital converter means (88) having an output terminal connected with a digital indicator, and a pair of input terminals;
 2. voltage divider means (90) including an output terminal connected with one input of said analog-to-digital converter means, and a pair of input terminals;
 3. an internal reference voltage source (72') connected with one input terminal of said voltage divider means; and
 4. means for supplying the load measuring voltage ($V_M$) to the other input terminals of said analog to digital converter means and to said voltage divider means, respectively.

5. In a weighing apparatus including a stationary member, a load-responsive movable member displaceable from a no-load position toward a load position relative to said stationary member, means associated with said stationary member for generating a magnetic field, a compensation coil connected with said movable member and arranged in said magnetic field, position sensing means connected for generating a position signal as a function of the displacement of the movable member from its no-load position, control means responsive to said position signal for supplying to said compensation coil compensating current of a magnitude to produce an electromagnetic force for returning the movable member toward its initial no-load position, and load indicating means for indicating the magnitude of the load applied to said movable member as a function of the compensating current supplied to said compensation coil;

the improvement which comprises
linearization means for modifying said load indicating means to effect linearization of the indication of the load indicating means over the weighing range, said load indicating means including
a. a measuring resistor (84) connected with said compensation coil to provide a load measuring voltage ($V_M$);
b. digital voltmeter means (86') connected across said measuring resistor for providing a digital indication of the load applied to said movable member;
c. analog multiplier means (94) connected between said measuring resistor means and said digital voltmeter means for adding to said measuring voltage a signal that is a function of the square of the measuring voltage;
d. a potentiometer (102) having a pair of fixed terminals connected across said measuring resistor, said potentiometer also having a tap connected with the input terminal of said analog multiplier means;
e. voltage divider means including a pair of resistors (96, 98) connecting one fixed terminal of said potentiometer means and the output terminal of said analog multiplier means with one terminal of said digital voltmeter means; and
f. means connecting the other fixed terminal of said potentiometer means with another terminal of said digital voltmeter means.

* * * * *